UNITED STATES PATENT OFFICE.

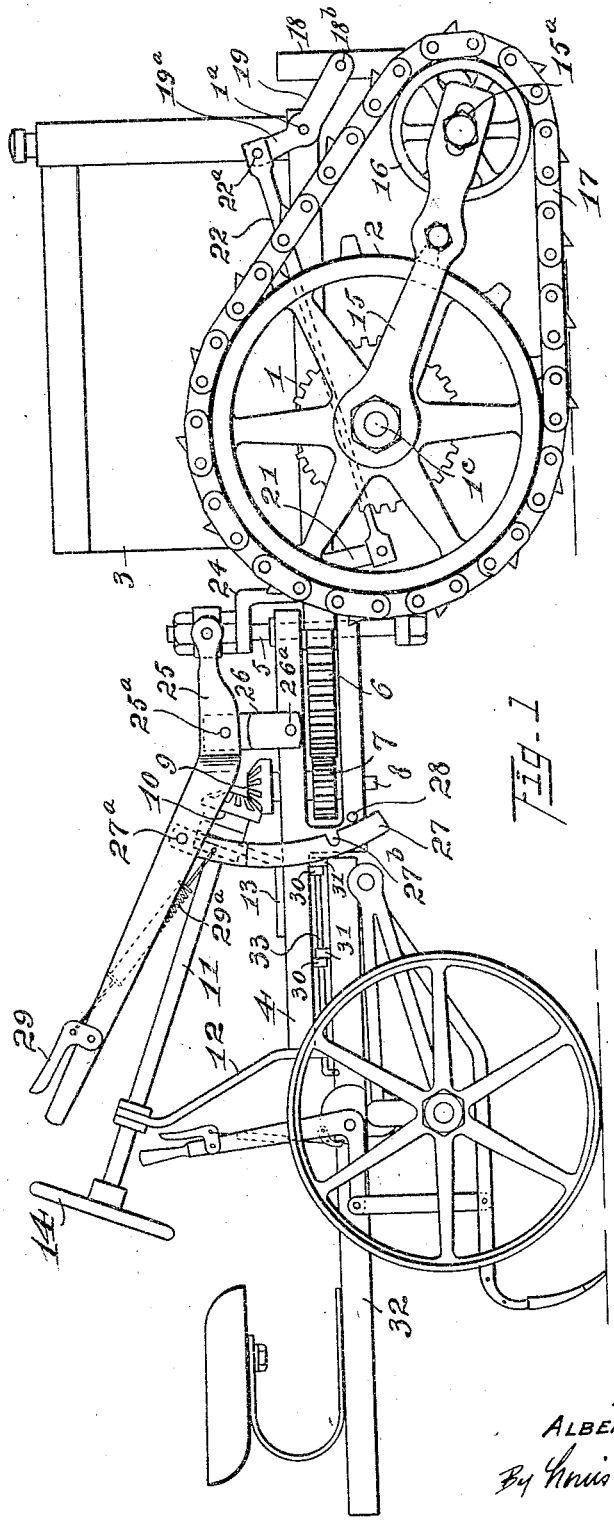

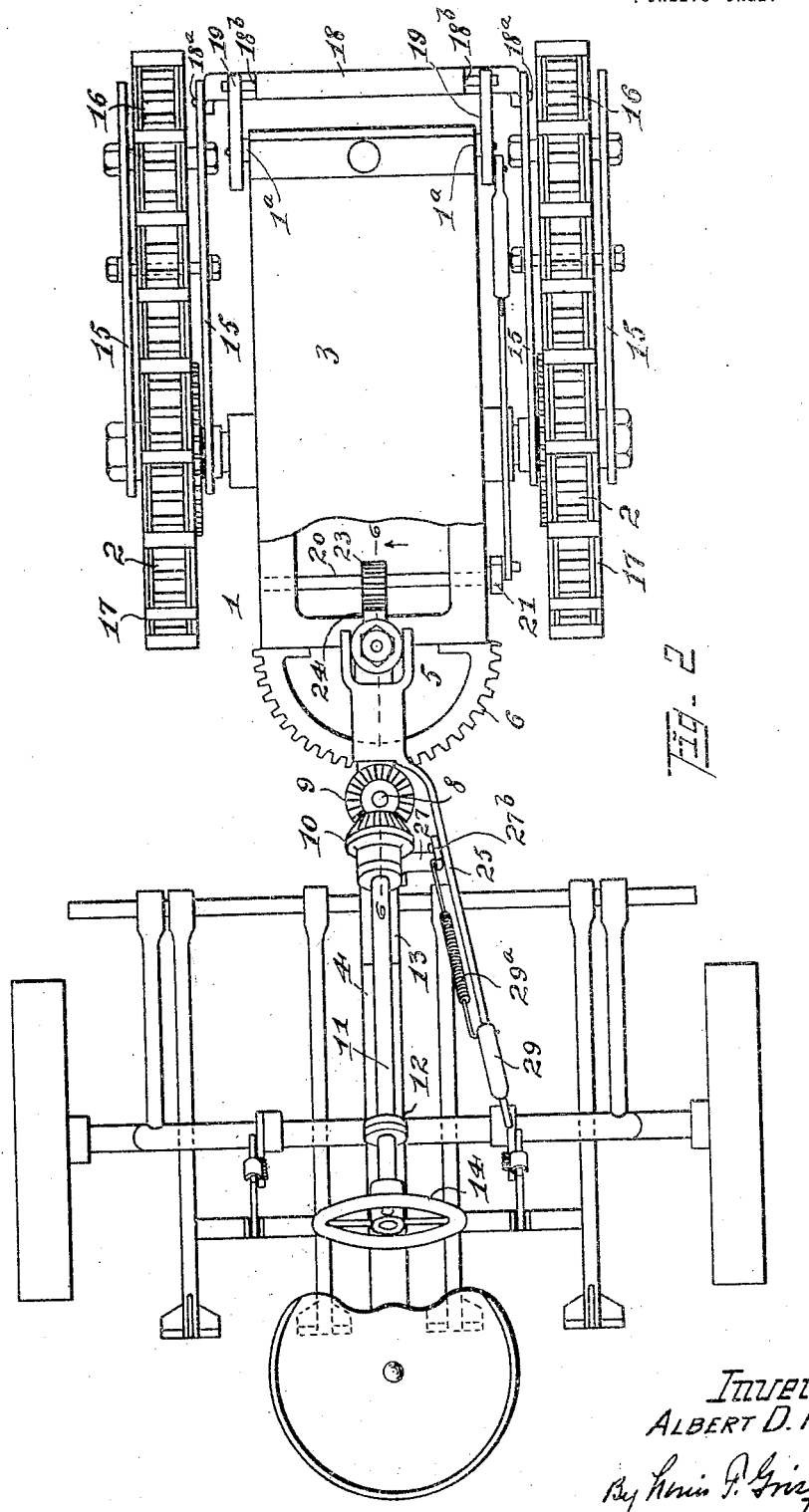

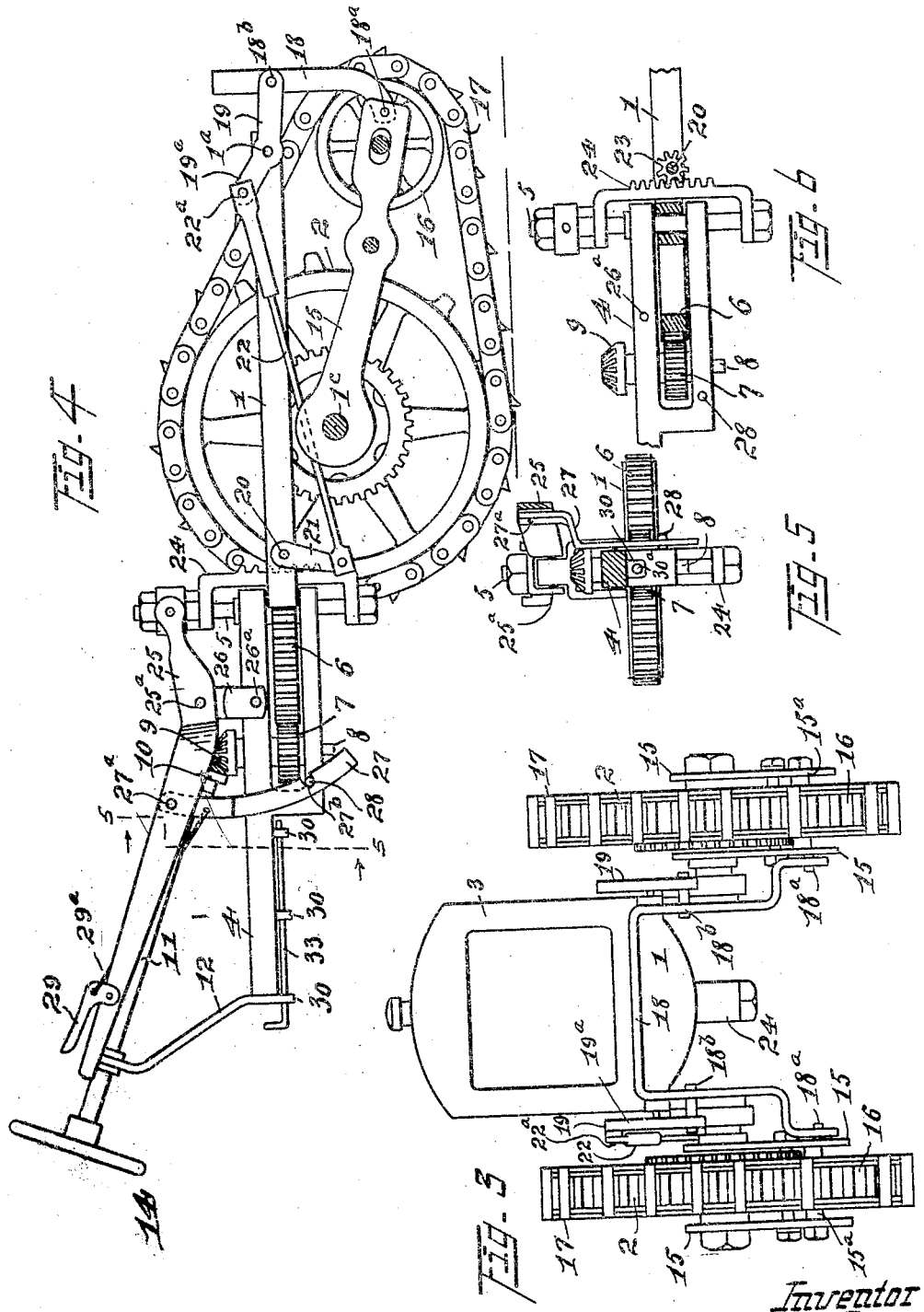

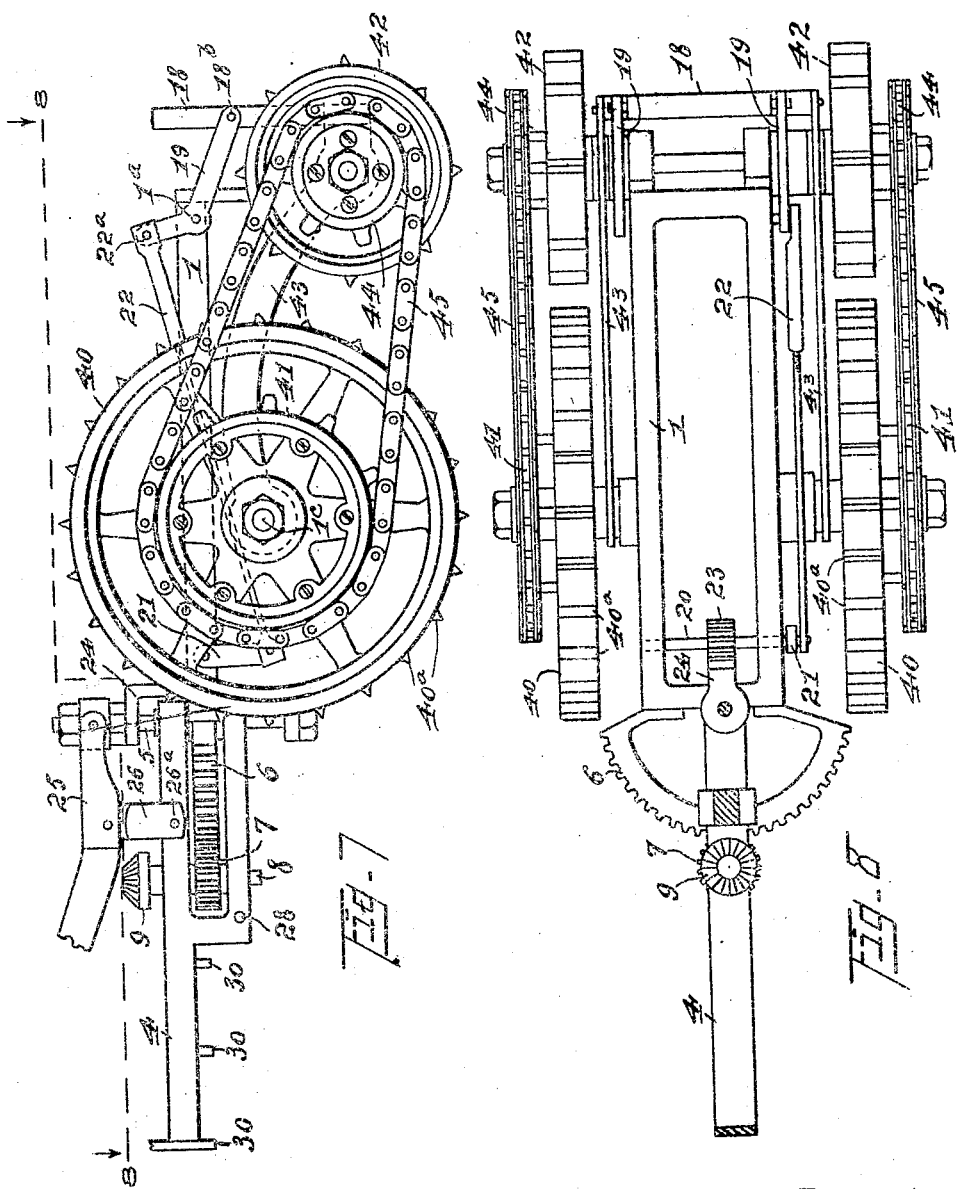

ALBERT D. RAY, OF CLEVELAND, OHIO.

TRACTOR.

1,383,425.   Specification of Letters Patent.   Patented July 5, 1921.

Application filed January 26, 1920. Serial No. 353,969.

*To all whom it may concern:*

Be it known that I, ALBERT D. RAY, a citizen of the United States, residing at Cleveland, in the county of Cuyahoga and State of Ohio, have invented certain new and useful Improvements in Tractors, of which the following is a specification.

This invention relates to improvements in tractors adapted to farm purposes in general, particularly for the draft of agricultural implements.

There are various types of tractors, some of them being classified as endless track and others as two-wheeled tractors. Most of these vehicles are adaptable to the operation of certain implements but are not efficient in their coaction with other appliances commonly used on a farm. The so-called endless track tractor possesses advantages for some kinds of work, while the two-wheeled tractor is desirable for others. The present invention embodies the advantageous features of the two general types of tractors, having for its primary object the provision of a motor driven vehicle for draft purposes, that is compact, durable, simple, economical, and efficient, the salient factor being efficiency. With this in view the invention provides a tractor of novel construction adaptable to the draft of, and effective coöperation with any of the agricultural implements in common use. It provides a swiveled or oscillating connection that adapts the tractor and its consort to uneven ground conditions. It further provides a convertible construction that enhances the utility of the machine through economy of fuel consumption and wear on moving parts. It provides an adjustable tread construction by which great traction power may be attained when the machine is employed for heavy work, such as deep plowing, and accommodating it to lighter top soil work, such as cultivating, disking, harrowing, seeding or mowing where less traction power is required. This adjustable feature also facilitates the steering of the tractor when it is desired to make short turns. The improved tractor may be made comparatively light and still be highly efficient, which is an important factor of economy.

With these and other apparent objects and advantages in view, the invention consists in the construction, combination and arrangement of parts as hereinafter described and pointed out definitely in the appended claims, reference being had to the accompanying drawings which are made part of the specification, similar reference characters being employed to designate corresponding parts.

In the said drawings Figure 1 is a side elevation of an embodiment of the invention, showing the tractor as connected with a cultivator.

Fig. 2 is a plan view of the tractor and cultivator attached.

Fig. 3 is a front elevation.

Fig. 4 is a side elevation of the machine with the traction elements on the near side removed, and showing the front wheels elevated.

Fig. 5 is a fragmentary section on line 5—5 of Fig. 4.

Fig. 6 is a fragmentary section on line 6—6 of Fig. 2.

Fig. 7 is a fragmentary side elevation of a modified construction, and Fig. 8 is a plan section on line 8—8 of Fig. 7.

In the preferred construction a horizontal frame 1 is adapted to carry the operating mechanism. Drive wheels 2 are mounted on said frame and driven by an engine and suitable transmission mechanism, said engine being supported by the frame within the casing 3. It is not deemed necessary to show the engine as there are various types of internal combustion engines that are applicable to the present improved tractor.

A reach member 4 is connected with the frame 1 by a swivel pin or king-bolt 5, said member 4 being adapted to horizontal oscillation on said member 5. A segmental rack 6 is attached to the rear of the frame 1, said rack being in mesh with a spur gear 7. The rack and gear are housed in the member 4, as shown, said gear 7 being fixed on a stub shaft 8 which carries a bevel gear 9, said gear 9 being in mesh with a companion gear 10 carried on the steering rod 11. The steering rod 11 is mounted in suitable brackets 12 and 13 which are attached to the member 4, and is provided with a hand-wheel 14. It will readily be seen that the tractor can be guided or turned to the right or left by the steering rod 11, through the coaction of the gears 10, 9, 7 and 6.

Rocker arms 15 are journaled on the axles that support the drive wheel 2. These arms extend forward and are provided with adjustable bearings at 15ª for auxiliary traction wheels 16. The wheels 16 are of less diameter than the drive wheels 2 and are in alinement with said wheels 2. Sprocket traction chains 17 connect the wheels 2 and the wheels 16 and are driven by said wheels 2. A yoke 18 is pivotally connected at 18ª with the two inner rocker arms 15, and levers 19 fulcrumed on the frame 1 at 1ª are pivotally connected with the yoke 18 at 18ᵇ. A shaft 20 is journaled transversely in the frame 1, said shaft being provided with a depending crank arm 21 which is connected by a rod 22 with the arm 19ª of one of the levers 19, as shown at 22ª. The shaft 20 carries a spur gear 23 which meshes with a vertically movable rack 24, said rack being operated by a lever 25 and guided by the swivel member 5. The lever 25 is fulcrumed at 25ª on a rockable member 26 pivotally connected with the member 4 at 26ª thereby providing the necessary movement of the fulcrum 25ª when the lever 25 is actuated to impart a vertical movement to the rack member 24. Upward movement of the rack 24, acting on the gear 23, causes the shaft 20 to turn and, through the coaction of the mechanism made up of the members 21, 22, 19, 18 and 15, raises the forward wheels 16, their axes moving in an arc with the main-drive wheel axles 1ᶜ as a center. Notable among the advantages incident to this operation, are, first, the regulation of the traction power to the working conditions. For heavy work, such as deep plowing, where greater traction is desirable, the forward wheels 16 are dropped down, as shown in Fig. 1. For light top soil work, that requires less traction force, the wheels 16 are raised and less motive energy is required to drive the tractor, which results in economy of fuel consumption, increased efficiency and life of the machine. Second, the adjustable forward wheel construction, facilitates the turning of short corners, and aids in extracting the treads from dead furrows and ditches, or soft loam soil.

A locking bar 27 is pivotally connected with the lever 25 at 27ª. Said bar is provided with one or more notches 27ᵇ, which are adapted to engage a projection 28 on the member 4. The operation of said bar is controlled by a lever 29 and spring connection 29ª.

Depending projections 30 are provided on the reach member 4. Said projections have eyes 30ª therein arranged in longitudinal alinement and adapted to register with corresponding eyes in fixtures 31 attached to the implement reach 32. When the implement is connected with the tractor the fixtures 31 are in juxtaposition to, and forward of the projections 30, and a connecting rod or pintle 33 is passed through the registering eyes, thereby hitching the implement to the tractor and allowing an oscillating movement between said tractor and implement, thereby adapting the machine and its consort to coöperative action on uneven ground conditions without disarrangement of the working elements, or inconvenience to the operator, the tractor being operated from the seat of the implement.

In the modification illustrated in Figs. 7 and 8, it will be noted that the construction and the operation in general is the same as that of the preferred form; the traction elements are, however, different. In this modification the master drive wheels 40 are in direct contact with the ground, being provided with suitable traction lugs 40ª and sprockets 41. Forward wheels 42 are journaled in the rocker members 43 which have an arcuate movement centering on the axles 1ᶜ. Sprockets 44 are attached to the wheels 42, said sprockets 44 being connected with the sprockets 41 by the chain 45. The vertical position of the wheels 42 relatively to the wheels 40, or the raising and lowering of said wheels 42 is controlled in the same manner as that described in reference to the preferred construction.

It will be understood that various alterations and modifications in details of construction are possible without departing from the spirit of my invention, and that I am therefore not limited to the specific form as shown and described, only so far as governed by the scope of the appended claims.

What I claim and desire to secure by Letters Patent is:

1. In a tractor, the combination of a supporting frame, a motor carried on said frame, main traction wheels mounted on the frame and adapted to be driven by the motor, rocker arms journaled on the axes of the main traction wheels and extending radially therefrom, auxiliary wheels journaled in said rocker arms, driving connecting means between the main traction wheels and the auxiliary wheels, compound lever mechanism connected with the frame and the rocker arms for vertically oscillating said rocker arms, rack and pinion mechanism for operating said lever mechanism, a reach member horizontally swiveled to the frame, means connected with said reach member for actuating the said rack, and coacting means connected with said reach member and the frame for horizontally oscillating the frame.

2. In a tractor, the combination of a supporting frame, a motor carried on said frame, main traction wheels mounted on the frame and adapted to be driven by the motor, rocker arms journaled on the axes of the main traction wheels and extending radially therefrom, auxiliary wheels journaled in said rocker arms, compound lever mechanism connected with the frame and the rocker arms for vertically oscillating said rocker arms thereby imparting arcuate movement to the auxiliary wheels, rack and pinion mechanism for operating said lever mechanism, a reach member horizontally swiveled to the frame, means connected with said reach member for actuating the aforesaid rack, coacting means connected with said reach member and the frame for horizontally oscillating the frame, and vertically oscillatable implement-hitch means connected with the reach member.

In testimony whereof I affix my signature.

ALBERT D. RAY.